(12) United States Patent
Beard et al.

(10) Patent No.: US 7,699,354 B2
(45) Date of Patent: Apr. 20, 2010

(54) MARINE RISER ASSEMBLY

(76) Inventors: Michael E. Beard, 6043 Spring Creek La., Spring, TX (US) 77379; David J. Cole, 5051 Meadowlark, Katy, TX (US) 77493; Christopher S. Caldwell, 95 N. Delta Mill Cir., The Woodlands, TX (US) 77385; Michael B. Foley, 8415 Pine Shores Dr., Humble, TX (US) 77346

( * ) Notice: Subject to any disclaimer, the term of this patent is extended or adjusted under 35 U.S.C. 154(b) by 759 days.

(21) Appl. No.: 11/414,315

(22) Filed: Apr. 28, 2006
(Under 37 CFR 1.47)

(65) Prior Publication Data
US 2007/0252387 A1 Nov. 1, 2007

(51) Int. Cl.
*F16L 17/00* (2006.01)
(52) U.S. Cl. .................... 285/123.13; 285/108
(58) Field of Classification Search ................ 285/397, 285/95, 108, 336, 343, 339, 917, 349, 123.13
See application file for complete search history.

(56) References Cited

U.S. PATENT DOCUMENTS

| | | | | |
|---|---|---|---|---|
| 1,567,813 A | * | 12/1925 | Oleson | 277/614 |
| 2,013,293 A | * | 9/1935 | Snell et al. | 285/39 |
| 2,413,308 A | * | 12/1946 | Arnold | 285/95 |
| 2,647,770 A | * | 8/1953 | Tollefsbol | 277/605 |
| 2,878,039 A | * | 3/1959 | Hoegee et al. | 285/249 |
| 3,993,331 A | * | 11/1976 | Schwarz | 285/53 |
| 4,043,575 A | | 8/1977 | Roth | |
| 4,097,069 A | | 6/1978 | Morrill | |
| 4,159,132 A | * | 6/1979 | Hitz | 285/39 |
| 4,193,617 A | * | 3/1980 | Hitz | 285/336 |
| 4,239,242 A | * | 12/1980 | Burns | 277/612 |
| 4,307,902 A | | 12/1981 | Schnatzmeyer | |
| 4,330,140 A | | 5/1982 | Hampton | |
| 4,411,455 A | | 10/1983 | Schnatzmeyer | |
| 4,431,215 A | | 2/1984 | Moyer | |
| 4,441,725 A | * | 4/1984 | Bailey | 277/614 |
| 4,626,002 A | * | 12/1986 | Hagemeister et al. | 285/95 |
| 4,886,113 A | * | 12/1989 | Ross et al. | 166/51 |
| 4,886,304 A | * | 12/1989 | Kunsman | 285/104 |
| 4,930,791 A | * | 6/1990 | Ungchusri et al. | 277/607 |
| 4,984,826 A | * | 1/1991 | Yokomatsu et al. | 285/101 |
| 5,076,614 A | * | 12/1991 | Yokomatsu et al. | 285/101 |
| 5,112,087 A | * | 5/1992 | Haruki | 285/101 |

(Continued)

OTHER PUBLICATIONS

Brochure: Oil States Industries, Inc., "FlexJoints" © 2000, 6 pages.

(Continued)

*Primary Examiner*—Aaron M Dunwoody

(57) ABSTRACT

A marine riser assembly having a first tubular member having an external surface with a plurality of first axially spaced formations, a second tubular member having an external surface with a plurality of second axially spaced formations thereon, a segmented ring in surrounding relationship to the first and second tubular members, the segmented ring having an inner surface with a plurality of formations engageable with the formations on the first and second tubular members, the engageable formations serving to urge the first and second tubular members toward each other when the segmented ring is subjected to radially inwardly directed compressive forces, a sleeve in surrounding relationship to force the engageable formations together and a seal assembly for sealing against external and internal pressure.

16 Claims, 9 Drawing Sheets

U.S. PATENT DOCUMENTS

| | | | |
|---|---|---|---|
| 5,131,632 A * | 7/1992 | Olson | 285/382 |
| 5,150,924 A * | 9/1992 | Yokomatsu et al. | 285/101 |
| 5,150,925 A * | 9/1992 | Yokomatsu et al. | 285/101 |
| 5,152,556 A * | 10/1992 | Holland et al. | 285/353 |
| 5,172,943 A * | 12/1992 | Shimada | 285/323 |
| 5,505,502 A | 4/1996 | Smith et al. | |
| 5,558,375 A * | 9/1996 | Newman | 285/23 |
| 5,634,671 A | 6/1997 | Watkins | |
| 5,782,500 A * | 7/1998 | Mate | 285/24 |
| 5,915,738 A * | 6/1999 | Guest | 285/24 |
| 5,954,374 A | 9/1999 | Gallagher et al. | |
| 5,964,486 A | 10/1999 | Sinclair | |
| 6,070,912 A * | 6/2000 | Latham | 285/61 |
| 6,328,349 B2 * | 12/2001 | Bandlow et al. | 285/319 |
| 6,371,531 B1 * | 4/2002 | Robison | 285/342 |
| 6,471,861 B1 * | 10/2002 | Burgard et al. | 210/232 |
| 6,520,262 B2 | 2/2003 | Barnett et al. | |
| 6,609,572 B1 | 8/2003 | Andersen et al. | |
| 6,688,814 B2 | 2/2004 | Wetch et al. | |
| 6,755,447 B2 | 6/2004 | Galle, Jr. et al. | |
| 6,796,586 B2 * | 9/2004 | Werth | 285/243 |
| 6,824,171 B2 * | 11/2004 | Milberger et al. | 285/123.13 |

OTHER PUBLICATIONS www.perkinelmer.com "Static Seals" © 1998-2004, 1 page.

* cited by examiner

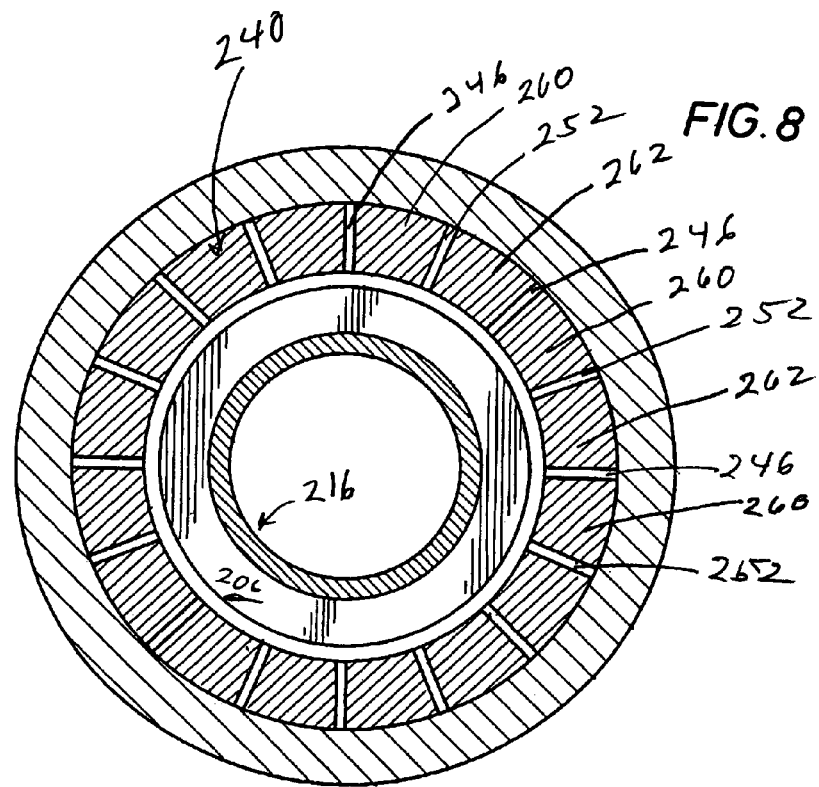
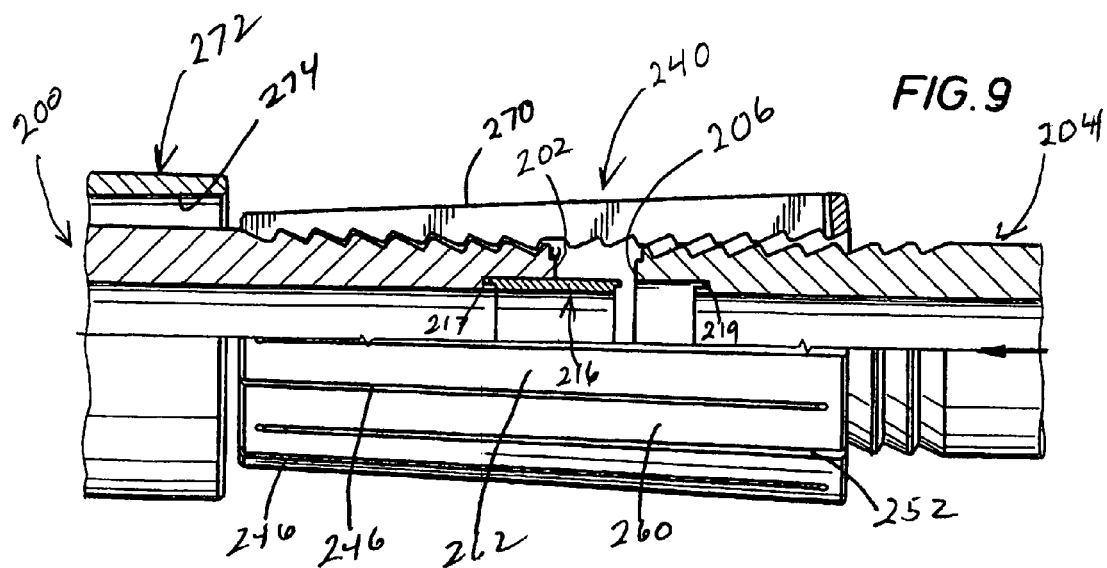

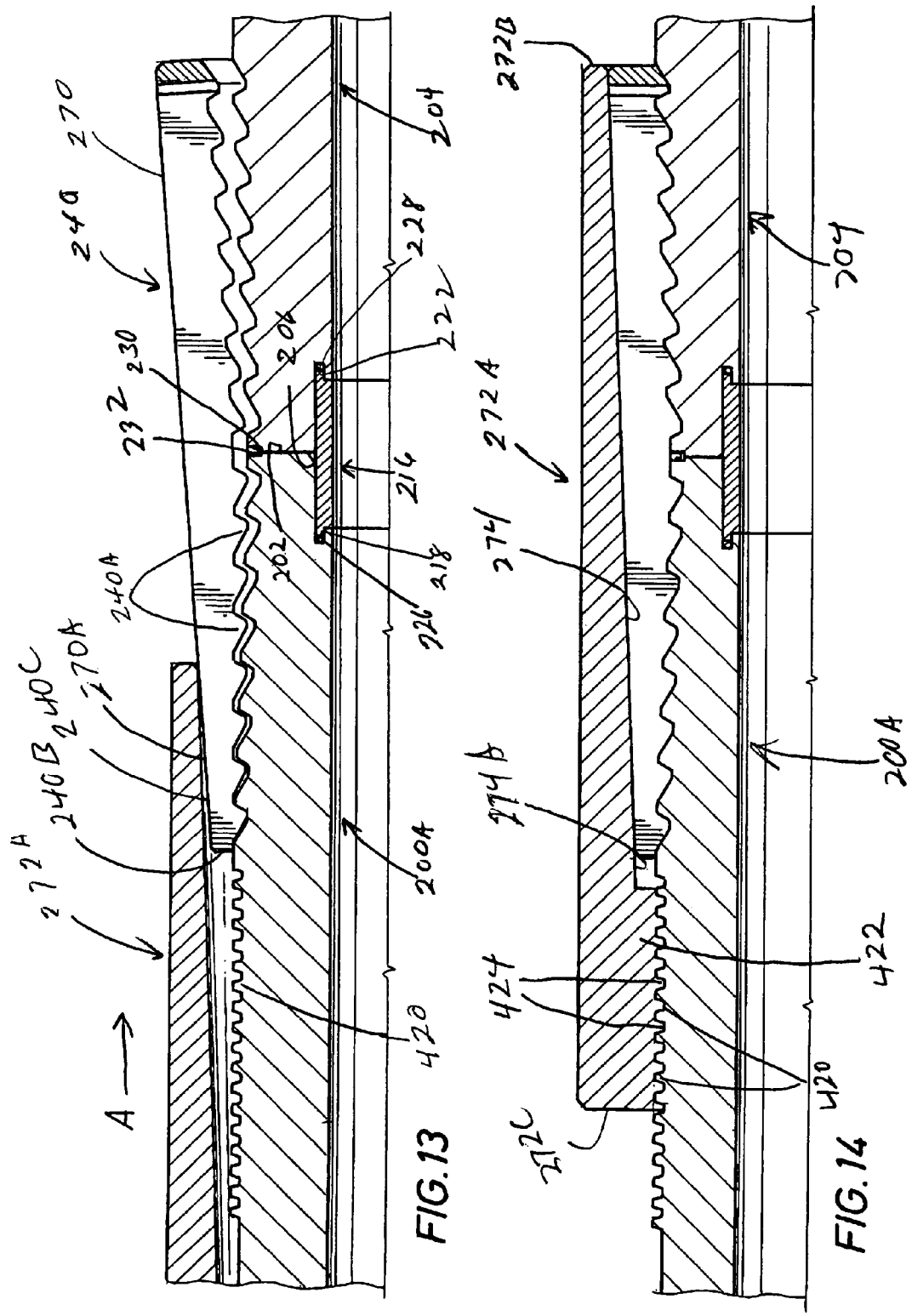

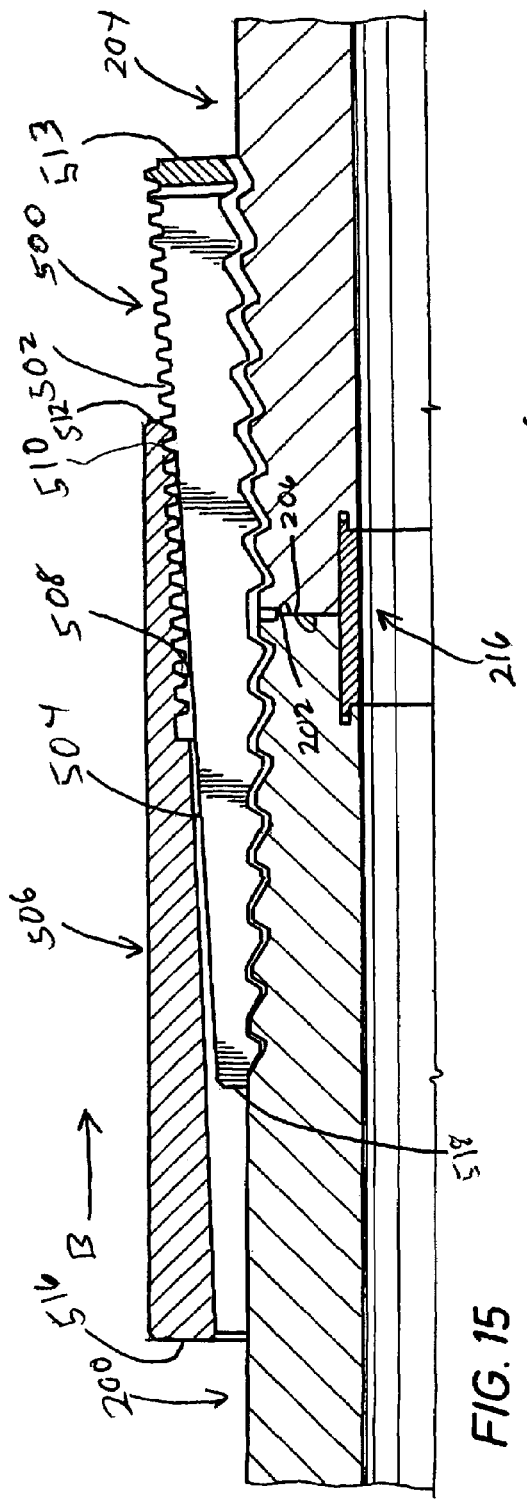
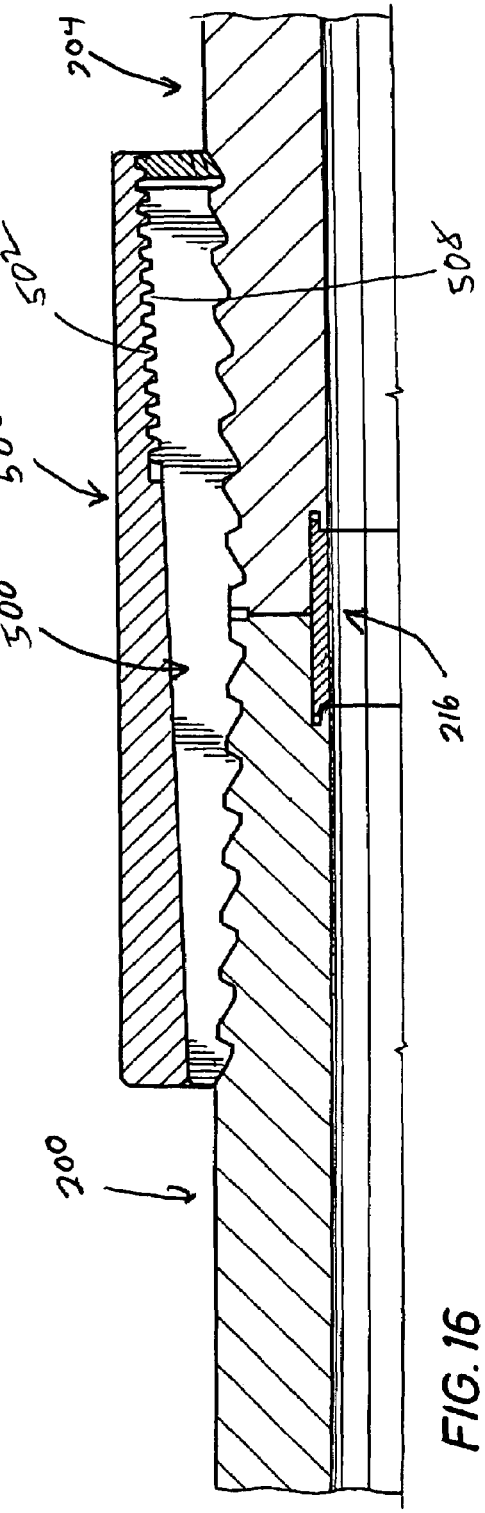
FIG. 15
FIG. 16

MARINE RISER ASSEMBLY

BACKGROUND OF THE INVENTION

1. Field of the Invention

The present invention relates to marine riser assemblies.

2. Description of Prior Art

Drilling, production and completion of offshore wells from a floating platform, e.g., a vessel, tension leg platform, etc. is typically conducted through a riser assembly which extends from the platform to the wellhead on the sea floor. The riser assembly typically comprises a series of pipe sections connected end to end. The prior art abounds with numerous methods to connect the individual pipe sections making up the marine riser assembly and includes threaded connections, weld-on connectors, etc. While the platform from which the wellbore activities are being conducted is maintained as nearly as possible in the fixed position above the wellhead, there is always some variation in this relationship, such that there is relative lateral and vertical shifting between the two. Accordingly, the riser assembly must accommodate this relative movement between the platform and the wellhead as well as forces acting on the riser assembly from waves, currents and the like. Since the riser assembly is made up of various individual pipe sections, the connections between the pipe sections are required to withstand whatever flexing and moving forces occur in the riser assembly and still maintain sealing integrity.

SUMMARY OF THE INVENTION

In one preferred aspect, the present invention provides a riser assembly comprising a first tubular member having a first end face and an external surface with a first set of formations thereon. There is a second tubular member having a second end face and an external surface with a second set of formations thereon. A segmented ring is in surrounding relationship to the first and second tubular members, the segmented ring having an inner surface with a third set of formations engageable with the first set of formations and a fourth set of formations engageable with the second set of formations. The first and second set of formations have engageable surfaces to urge the first end face towards the second end face when the segmented ring is under radially inwardly directed compressive force. The second and fourth set of formations have engageable surfaces to urge the second end face toward the first end face when the segmented ring is under radially inwardly directed compressive force. An annular sleeve is in surrounding relationship to the segmented ring. The segmented ring and said annular sleeve have inner and outer surfaces, respectively, the engagement of the inner and outer surfaces exerting the compressive force. There is also a seal assembly that seals against external and internal pressure.

BRIEF DESCRIPTION OF THE DRAWINGS

FIG. 8 is a cross-sectional view taken along the lines 8-8 of FIG. 7.

FIG. 9 is an elevational view, partly in section, showing the embodiment of FIGS. 7 and 8 being assembled.

FIG. 13 is a fragmentary, elevational, cross-sectional view of another embodiment of the present invention.

FIG. 14 shows the embodiment of FIG. 13 in an assembled condition.

FIG. 15 is a fragmentary, elevational, cross-sectional view of another embodiment of the present invention; and FIG. 16 shows the embodiment of FIG. 15 in an assembled condition.

DETAILED DESCRIPTION OF PREFERRED EMBODIMENTS

Figure 1:
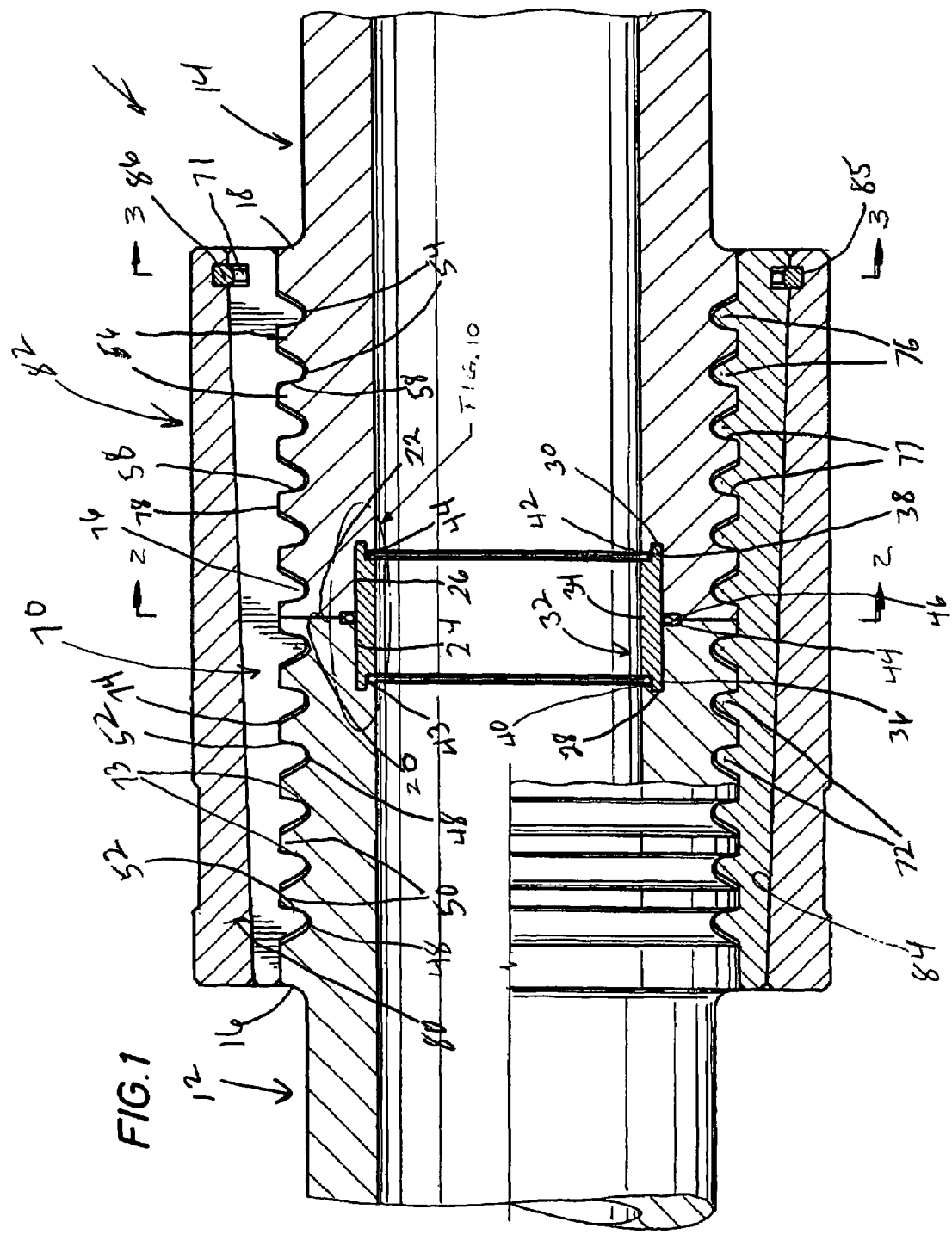
FIG. 1 is an elevational, cross-sectional view of one embodiment of the riser assembly of the present invention.

In the description which follows, like components have been given like reference numerals or characters.

Figure 10:
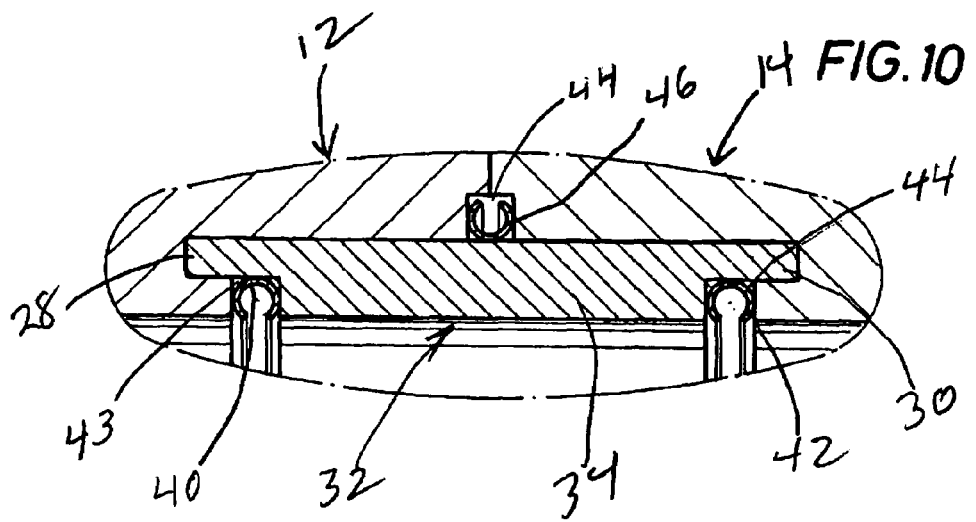
FIG. 10 is a detailed view of the circled areas shown in FIG. 1.

Referring first to FIG. 1, there is shown a riser assembly according to the present invention indicated generally as 10, the riser assembly 10 comprising a first tubular member 12 and a second tubular member 14. First tubular member 12 has an upset portion 16 while second tubular member 14 has an upset portion 18. Tubular member 12 has a first end face 20 while tubular member 14 has an end face 22. As seen, end faces 20 and 22 are adjacent one another and preferably in abutting relationship. Tubular member 12 has an annular counterbore 24 while tubular member 14 has an annular counterbore 26, counterbores 24 and 26 being in register and cooperating to form an annular, radially inwardly opening recess or guide receptacle. First tubular member 12 has an annular, axially extending groove 28 communicating with counterbore 24 while second tubular member 14 has an annular axially extending groove 30 communicating with counterbore 26. Received in the guide receptacle formed by counterbores 24 and 26, is a guide sub shown generally as 32, guide sub 32 being generally T-shaped when viewed in transverse cross-section and having an annular, radially inwardly extending rib 34 and first and second annular, axially extending flanges 36 and 38, flange 36 being received in groove 28, flange 38 being received in groove 30. As shown, flanges 36 and 38 are in engagement with the axially facing end walls forming grooves 28 and 30. Formed between rib 34 and first tubular member 12 is an annular radially inwardly facing recess 40, a similar annular radially inwardly facing recess 42 being formed between rib 34 and second tubular member 14. Received in recesses 40 and 42 are resilient seal rings, e.g., C rings, 43 and 44, respectively. Radially outwardly from guide sub 32 is an annular recess 44 formed by and between end faces 20 and 22. Received in recess 44 is a resilient seal ring, e.g., a C ring 46. As seen in FIG. 10, seal rings 43, 44 and 46 are C seals and provide an effective yet non-limiting way to ensure both contact and pressure energized sealing to seal against external and internal pressures. Although C seals are considered to be static seals, they can be pressure energized and are ideally suited for high temperatures that conventional elastomeric seals can not withstand. As is well known to those skilled in the art, C seals are generally designed for high pressure use. C seals can assume a shape wherein when they are compressed or pressure energized the diameter changes. This feature enables a clearance for the seal in the cavity at installation and a tighter fit between seal and cavity upon compression. This occurs as the seal outer diameter grows or seal inner diameter shrinks for an internal pressurized versus externally pressurized seal, respectively. As shown in FIG. 10, the seals 43 and 44 have their mouths open to the internal pressure inside tubular members 12 and 14 whereas seal 46 has its mouth open to the external pressure which would be acting upon tubular members 12 and 14. Accordingly, when pressure entered the seals 43 and 44 they would be forced into tighter engagement with the axial walls on either side of recesses 40 and 42. Likewise, when pressure entered seal ring 46 the seal would be forced into engagement with the axially facing walls forming seal cavity 44. C seals can be made from a variety of metallic materials. Typically, the body of such seals is made from a relatively rigid material which can be plated or coated with a soft metal plating which when the seal is installed will plastically deform into and fill surface imperfections or asperities in the control surfaces. For example, the body of the seal can be made from INCONEL or similar type materials with a coating of gold, silver or other softer metals which can conform to any irregularities as discussed above.

Formed on upset portion 16 of tubular member 12 are a series of alternating, annular grooves 48 and annular projections 50. Projections 48 have load flanks 52. In a similar manner, formed on the upset portion 18 of tubular member 14 are a series of alternating, annular grooves 54 and annular projections 56. Projections 56 have load flanks 58. As seen, load flanks 52 face away from end face 20 of tubular member 12 while load flanks 58 face away from end face 22 of tubular member 14.

Figure 2:
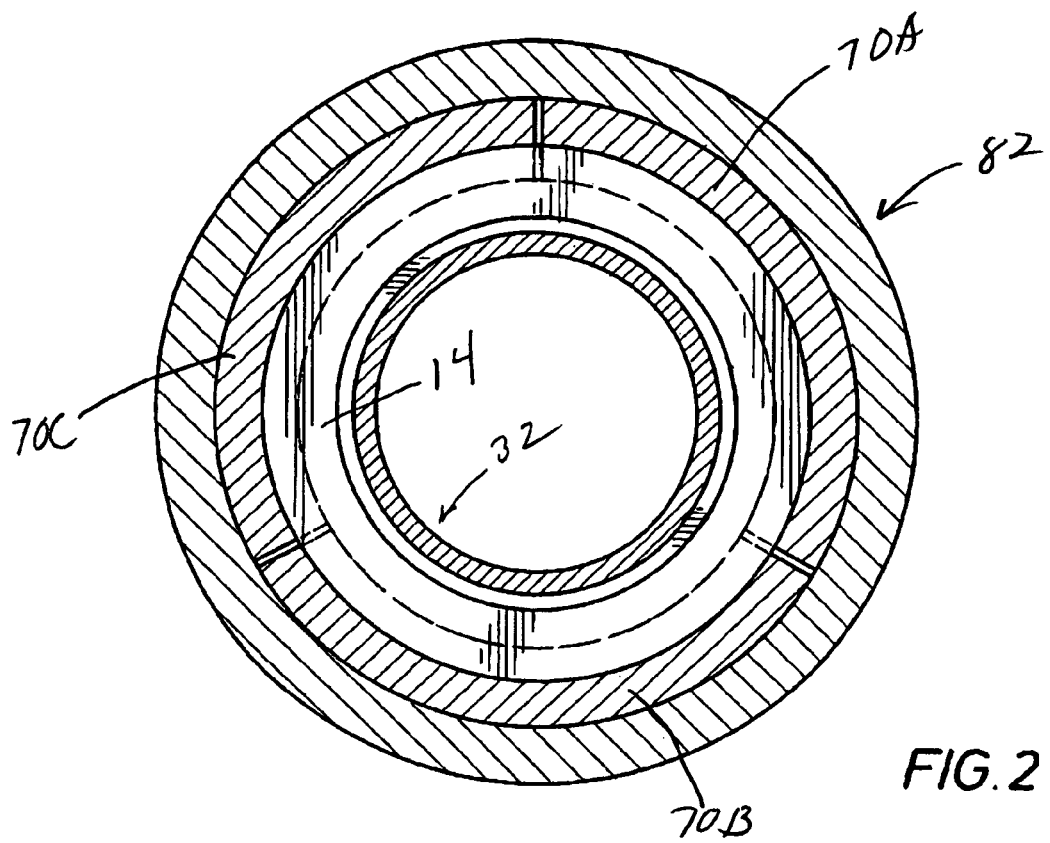
FIG. 2 is a cross-sectional view taken along the lines 2-2 of FIG. 1.

Disposed in surrounding relationship to tubular members 12 and 14 is a segmented ring 70. As best seen with reference to FIG. 2, segmented ring 70 comprises three individual sections 70A, 70B and 70C. Each of sections 70A, 70B and 70C are provided on their radially, inwardly facing surfaces with a first series of annular projections 72 alternating with a first series of annular recesses 74. Each of sections 70A, 70B and 70C also is provided with a second set of alternating annular projections 76 and annular grooves 78. Projections 72 are provided with load flanks 73 while projections 76 are provided with load flanks 77.

Annular projections 72 and grooves 74 are generally complementary to annular projections 50 and grooves 48 while annular projections 76 and grooves 78 are generally complementary to annular projections 56 and annular grooves 54. Stated differently, and as seen, projections 72 are receivable in grooves 48 while projections 76 are receivable in grooves 54. Basically, the interengaged projections and grooves are symmetric about an imaginary plane passing through and parallel to the abutting end faces 20 and 22. Basically, and with respect to the imaginary plane, it can be seen that projections and grooves 50 and 48 on tubular member 12 are a mirror image of projections and grooves 56 and 54 on tubular member 14. Likewise, projections and grooves 72 and 74 are mirror images of projections and grooves 76 and 78 on segmented ring 70. It needs to be understood that the respective engaged formations need not necessarily be the same. For example, the formations on tubular member 14 could be different from the formations on tubular member 12. In such a case, the formations on segmented ring 70 which engage the formations on tubular member 12 would be different from the formations on segmented ring 70 that engage the formations on tubular member 14, the idea being that the respective engaged formations be generally complementary to one another.

Received over segmented ring 70, is a sleeve shown generally as 82, sleeve 82 having a frustoconical, internal surface 84 which is complementary to frustoconical surface 80 formed by the individual segments 70A, 70B and 70C of segmented ring 70. Although the surfaces 84 and 80 are shown as being frustoconical, it will be apparent that other surface and shapes, including interengaged formations on the surfaces 84 and 80 could be employed, provided that sleeve 82 could be axially forced over segmented ring 70 and exert a radially inwardly directed compressive force against segmented ring 70. Segmented ring 70 also has an annular groove 71 which is in register with an annular groove 85 in sleeve 82. Received in the registering grooves 71 and 85 is a snap ring 86.

As noted, when sleeve 82 is forced over the external surface of segmented ring 70, an inwardly directed compressive force, actually a hoop force, will be exerted on segmented ring 70. Because of the angles of the grooves and projections on the tubular members 12 and 14 and the segmented ring 70, the tubular members 12 and 14 will be forced toward one another, i.e., end faces 20 and 22 will be forced towards one another. In this regard, it will be appreciated that the force exerted by sleeve 82 will force load flanks 52 and 73 into engagement forcing tubular member 12 towards tubular member 14 while the engagement of load flanks 58 and 77 will force tubular member 14 towards tubular member 12. In effect, a camming action occurs between the load flanks. Effectively, this will force end faces 20 and 22 into engagement albeit not in fluid tight engagement but, as noted above, fluid sealing against internal pressure will be provided by seal rings 43 and 44 while fluid sealing against external pressure will be provided by seal ring 46.

Figure 3:
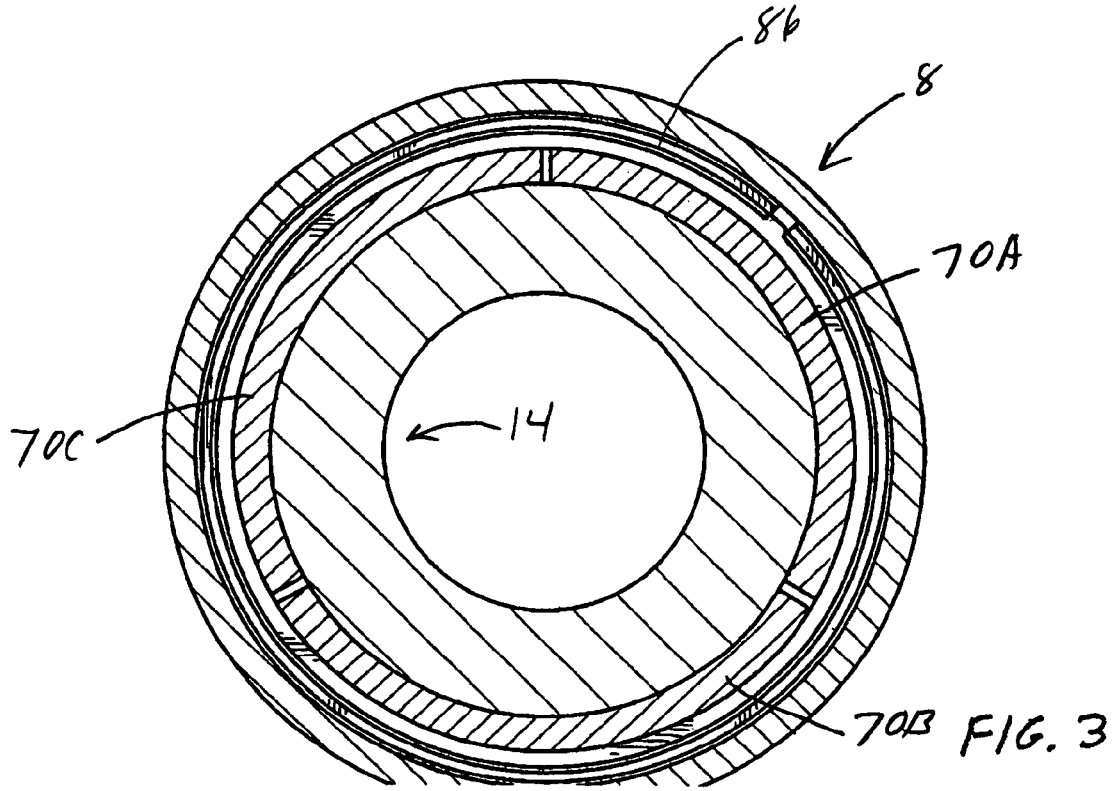
FIG. 3 is a cross-sectional view taken along the lines 3-3 of FIG. 1.
Figure 4:
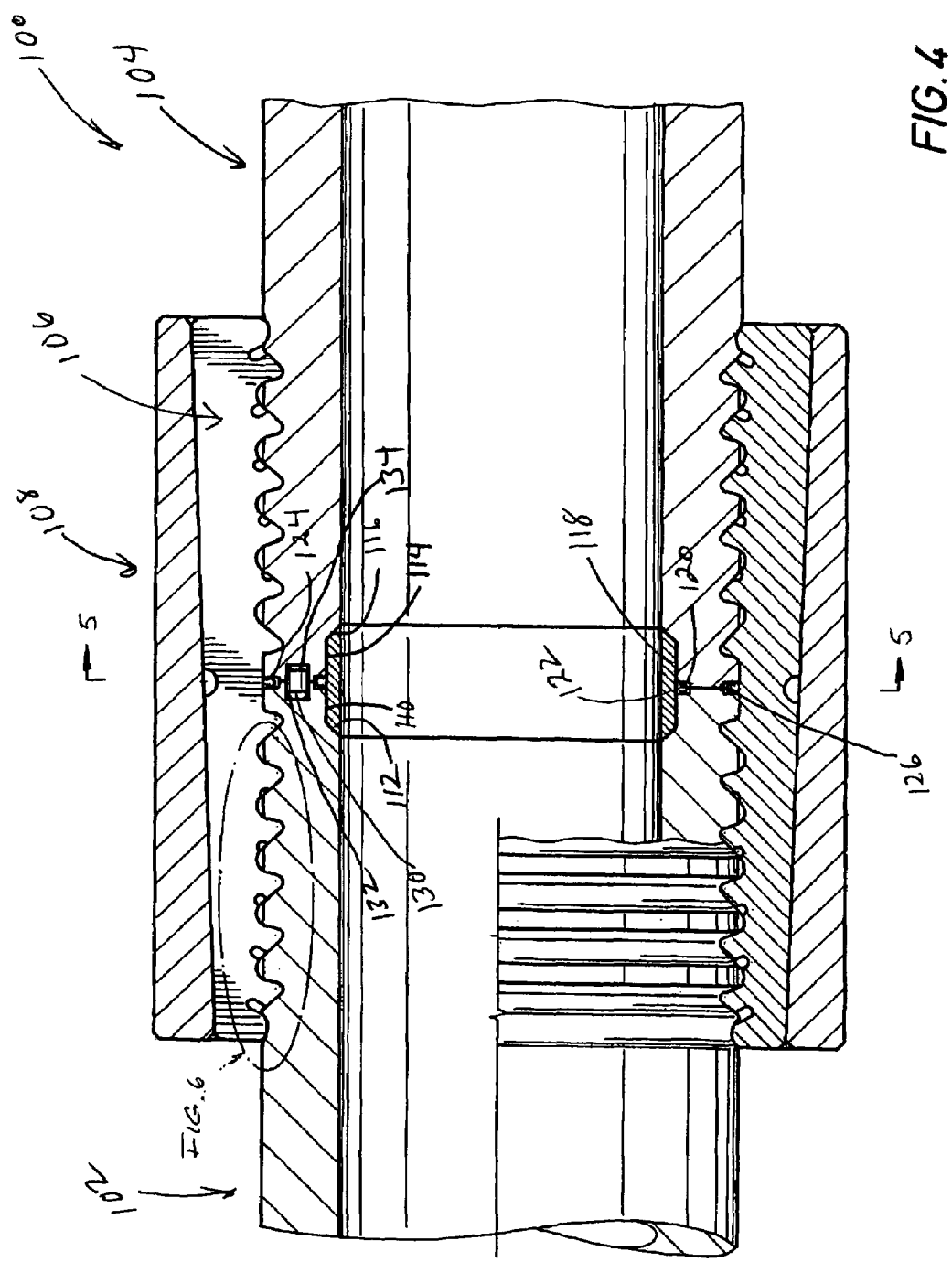
FIG. 4 is a elevational, cross-sectional view of another embodiment of the present invention.
Figure 5:
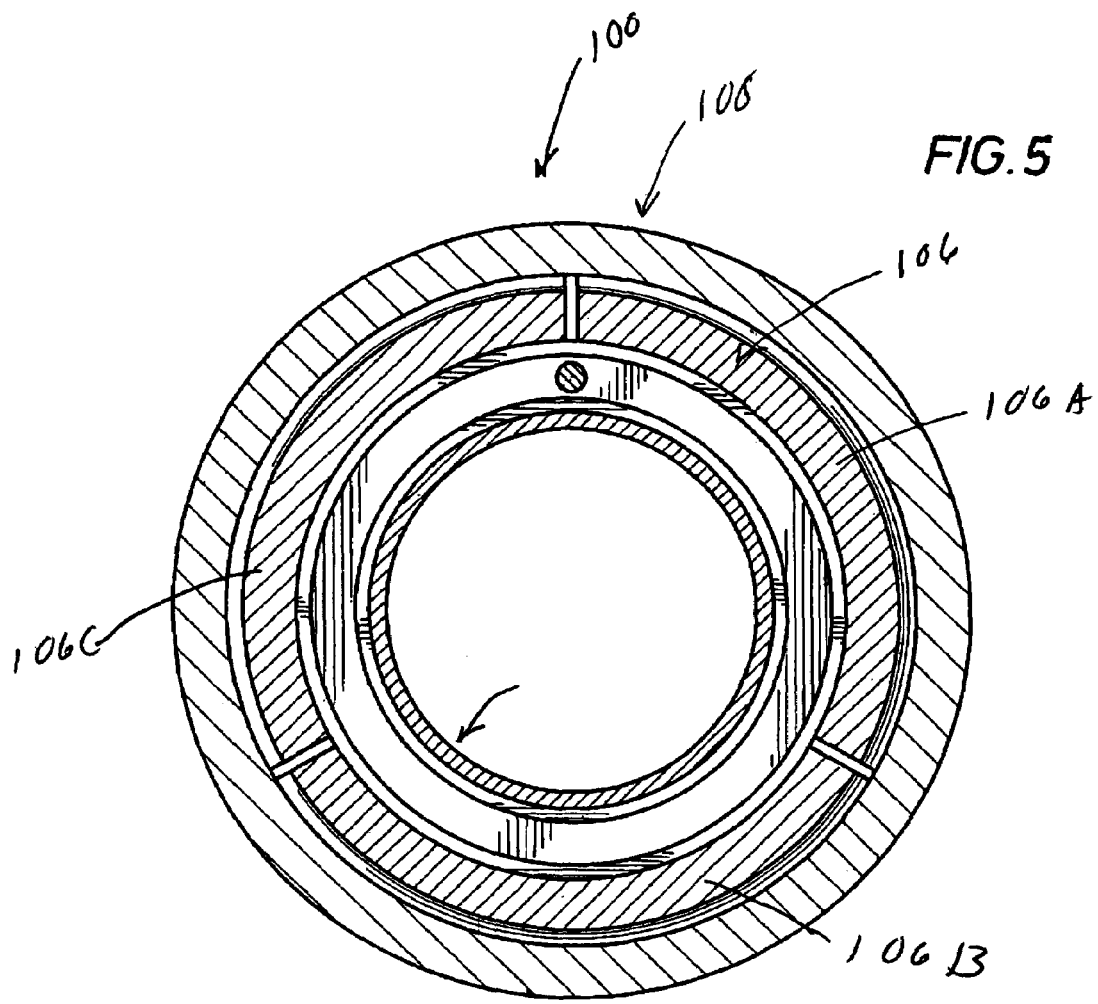
FIG. 5 is a cross-sectional view taken along the lines 5-5 of FIG. 6.

Referring now to FIG. 4, there is shown another embodiment of the present invention. The embodiment shown in FIG. 4 differs from that shown in FIGS. 1-3 primarily in the sealing assembly designed to seal against external and internal pressure. The riser assembly, shown generally as 100, in FIG. 4 comprises a first tubular member 102, a second tubular member 104, a segmented ring 106 and an external sleeve 108. As can be seen, tubular members 102, 104 and segmented ring 106 which is comprised of segments 106A, 106B and 106C (see FIG. 5) all have a plurality of alternating, annular projections and grooves which engage similarly formed projections and grooves on the exterior surface of tubular members 102 and 104. As in the case of the embodiment shown in FIG. 1, the formations, i.e., the grooves and the projections, are provided with engageable load flanks as described above with respect to the embodiment of FIG. 1, such that when the segmented ring 106 is under a radially inwardly directed compressive force, e.g., by sleeve 108, the engaged load flanks segmented ring 106 and tubular member 102 will force tubular member 102 towards tubular member 104 and likewise the engaged load flanks between segmented ring 106 and tubular member 104 will force tubular member 104 towards tubular member 102.

Tubular member 102 has a counterbore having an annular, radially inwardly facing wall 110 and a generally axially facing chamfered surface 112. Likewise, tubular member 104 has an annular, radially inwardly facing wall 114 and a chamfered surface 116. Walls 112 and 114 combined with surfaces 110 and 116 cooperate to form an annular, radially inwardly opening guide receptacle which, as seen, when viewed in transverse cross-section is in the shape of a trapezoid.

Received in the annular trapezoidal shaped guide receptacle is a guide ring 118 which, as seen has a shape complementary to the guide receptacle.

Figure 6:
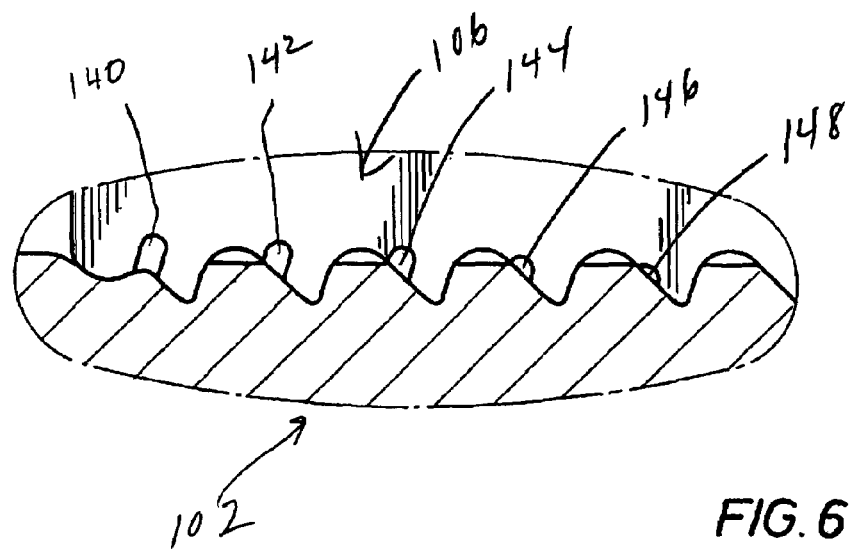
FIG. 6 is a detailed view of the circled section shown in FIG. 6.

A first annular pocket 120 is formed by and between the adjacent end faces of tubular members 102 and 104. Received in the annular pocket is a C seal 122. There is a second annular pocket 124 formed by and between the adjacent end faces of tubular members 102 and 104, a C seal ring 126 being received in pocket 124. As seen, pocket 118 is radially inwardly from pocket 124 and seals against internal pressure in the tubular members 102 and 104 while seal ring 126 disposed in the radially outermost pocket 124 seals against external pressure acting upon tubular members 102 and 104. An anti-rotation pin 130 is disposed in registering bores 132 and 134 in the adjacent end faces of tubular members 102 and 104, respectively. The encircled area of FIG. 1 is shown in FIG. 6. As can be seen, the segmented ring 106 is provided with a series of annularly extending, axially spaced reliefs 140-148 which decrease in radial depth but which serve to provide the riser assembly with greater flexibility.

Figure 7:
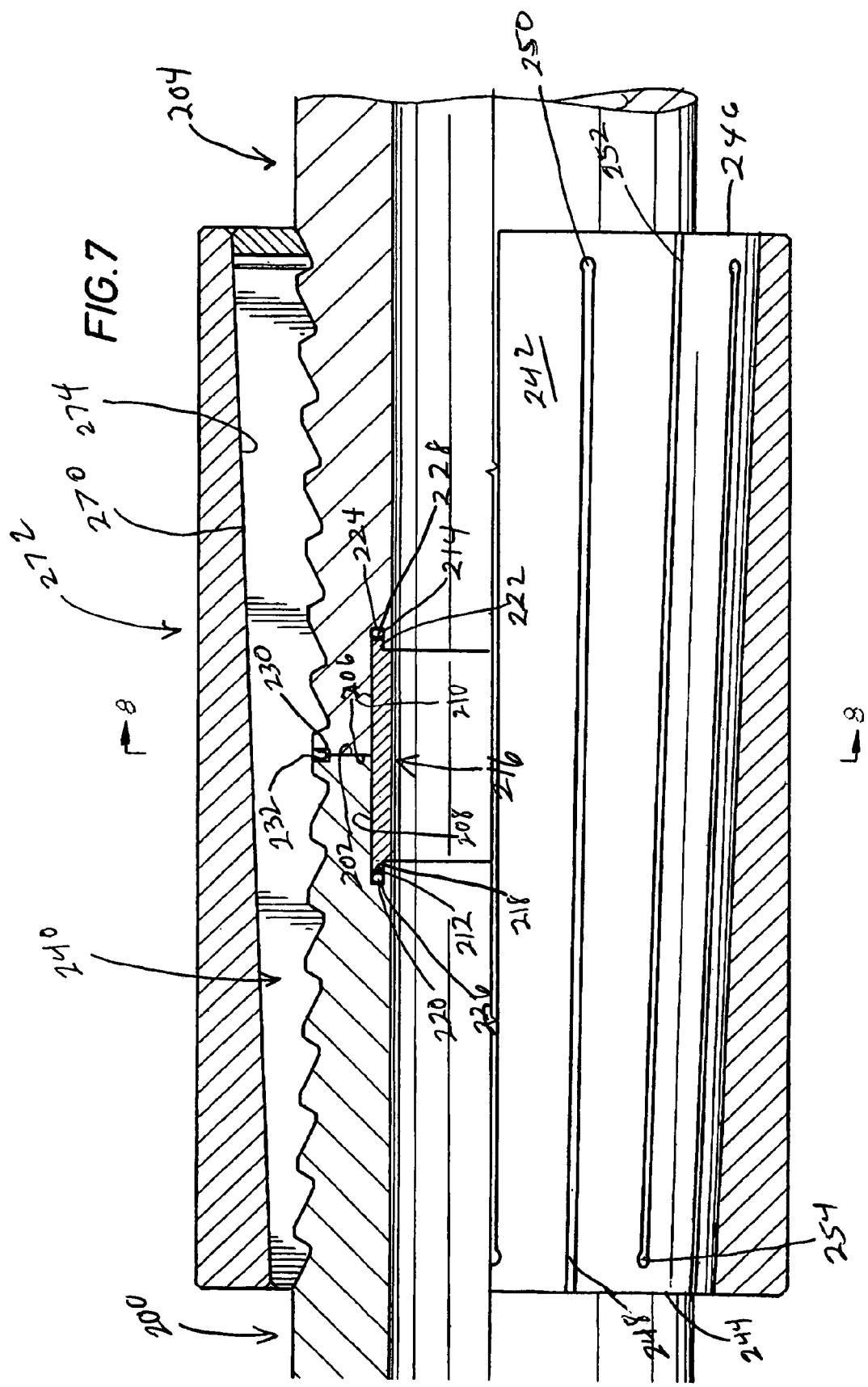
FIG. 7 is a elevational, cross-sectional view of another embodiment of the present invention.

Referring now to FIG. 7, there is shown another embodiment of the present invention. There is a first tubular member 200 having an end face 202 and a second tubular member 204 having an end face 206, end faces 202 and 206 being adjacent one another and preferably in engagement. Similar to the embodiment shown in FIG. 1, tubular members 200 and 204 have registering counterbores 208 and 210, respectively. Formed in first tubular member 200 is an annular, axially-facing groove 212 which opens into counterbore 208 while an annular, axially facing groove 214 in tubular member 204 opens into counterbore 210. Annular guide 216, like guide 32 shown in FIG. 1 is generally T-shaped in cross-section and has an annular, axially extending flange 218 which is received in groove 212 but is spaced from an end wall 220 in groove 212. Likewise, a second annular, axially extending flange 222 is received in groove 214 but is spaced from an end wall 224 forming groove 214. There thus are formed seal ring pockets in which are received C seal rings 226 and 228, respectively, seal rings 226 and 228 providing sealing against internal pressure. To provide sealing against external pressure, the end faces 202 and 206 cooperate to form an annular recess 230 in which is received a C seal ring 232.

The primary difference between the embodiments shown in FIG. 7 and the embodiments shown in FIGS. 1-6 is that the segmented ring 240 rather than being formed from a series of individual segments is a monolithic body. As best seen with reference to FIGS. 7-9, segmented ring 240 has an annular wall 242, a first end 244 and a second end 246. A series of circumferentially spaced, axially extending slits 248 extend from and through first end 244 and annular wall 242 to bores 250 distal second end 246. Likewise, there are a series of circumferentially spaced axially extending slits 252 which extend from and through first end 246 and annular wall 242 to bores 254 distal first end 244. As best seen in FIG. 8, slits 246 and 252 circumferentially alternate around segmented ring 240. The result is that there are formed a series of interconnected, axially extending, circumferentially expandable, alternating fingers 260 and 262. As can be seen, segmented ring 240 has an external, frustoconical surface 270. Received over external surface 270 of segmented ring 240 is an annular sleeve 272, annular sleeve 272 having an internal surface 274 which is frustoconical and complementary to surface 270. It will thus be seen, as in the embodiments described above, that when sleeve 272 is forced over segmented ring 240, tubular member 200 will be urged towards tubular member 204 and vice versa due to interengagement of load flanks, as described above with respect to the embodiments shown in FIGS. 1 and 4 on the engaged formations of tubular members 200, 204 and segmented ring 240.

In effect, segmented ring 240 is a collet which can be expanded circumferentially. In this regard, to assemble the riser assembly of FIG. 7 after guide 216 and seal rings 217 and 219 are in place, tubular member 200 is forced into ring 240 as shown in FIG. 9. At this point, it can be seen that the formations, i.e., the alternating projections and grooves on ring 240 would not be engaged with the projections of tubular member 204. By now forcing tubular member 204 into segmented ring 240 in a direction towards tubular member 200, the formations on segmented ring 240 and tubular member 204 will now be fully engaged as shown in FIG. 7. At this point, outer sleeve 272 can then be forced over segmented ring 240 resulting in a camming action by the load flank on the formations on segmented ring 240 against the load flank on formations of tubular members 200 and 204 forcing tubular members 200 and 204 towards one another and preferably faces 202 and 206 into engagement.

While the segmented ring 240 or collet has been described as being a monolithic, annular body, it is to be understood that ring 240 could be formed of a plurality of segments which cooperate to form an annular body. Thus, each section would have first and second ends and a wall with alternating slits as described above with respect to segmented ring 240. Thus, the individual segments could be used in the same manner as described above with respect to the other segmented rings made of individual sections. Indeed, in cases where a collet such as segmented ring 240 was employed in the form of segmented sections, the ability to circumferentially expand the fingers, as described above, would allow greater flexibility in the sense that each of the individual segments could, prior to being engaged with the tubular members, be in a substantially planar form, i.e., they could be wrapped around the tubular members. Thus, for example, such a collet assembly could be a single planar piece which was sized such that when it was wrapped around the tubular members, the sides along which the collet was split could be placed in close contact. Indeed, in certain situations such a form of the segmented ring 240 might be easier to install since it could be wrapped around the end of one of the tubular members carrying the formations and the two abutting sides welded together whereupon the second tubular member could be forced into the other end of the collet.

In the description above with respect to the segmented ring, the alternating slits are described as extending through the first end in the wall to bores distal the opposite wall. It will be understood that when the slits are described as terminating distal the first or second ends, e.g., ends 244 and 246, that such termination of the slits will be at a point close enough to the respective end such that the collet has sufficient flexibility to allow the fingers to expand. Indeed it will be recognized that the closer the slits are to be end before which they terminate, the more flexible the collet will be. Accordingly, the distance between the inwardly terminating end of the slits and the end of the collet to which those terminating ends are closest will vary depending upon the wall thickness, the degree of flexibility desired, etc. However, for a desired degree of flexibility, knowing the wall thickness, the distance can be readily determined.

The collet or segmented ring 240 can be used in many applications not associated with the connection of tubular members as described above. In this regard, the segmented ring would not have to have the formations as shown and described on the inner surface. For example, such a collet would be used if it were simply desired to connect two, generally cylindrical bodies together albeit not in a manner that they would be so tightly connected if inter-engaged formations were on the collet and the cylindrical bodies.

Figure 11:
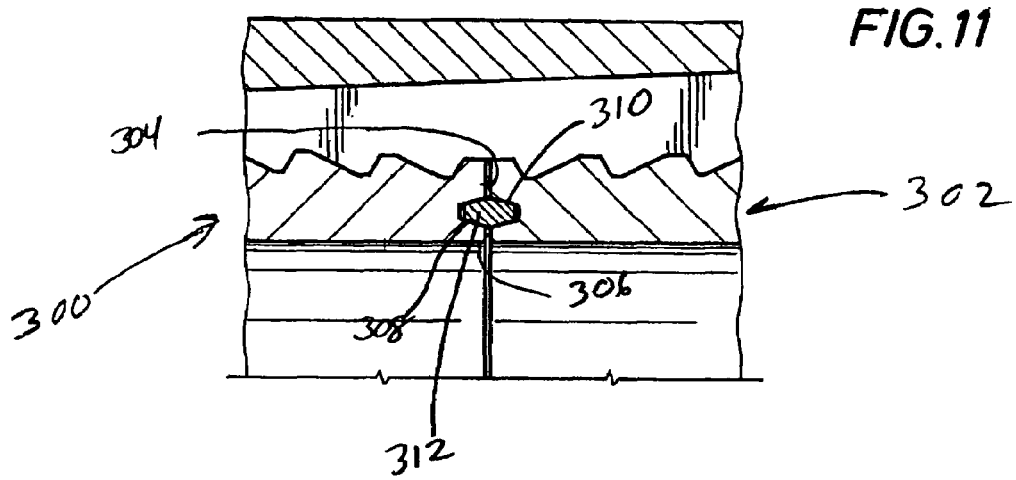
FIG. 11 is a fragmentary, cross-sectional view of another embodiment of the present invention.

Turning to FIG. 11, there is shown another embodiment of the present invention. First and second tubular members 300 and 302 have adjacent end faces 304 and 306. End face 304 has an annular, trapezoidal shaped groove 308 while end face 306 has a registering, annular trapezoidal shaped groove 310. Received in registering grooves 308 and 310 is an annular seal ring 312 which is metallic and which is complementary in shape to the overall groove formed by the combination of grooves 308 and 310. Thus, as seen, seal ring 312 has a generally hexagonal configuration when viewed in transverse cross-section, i.e., it is essentially formed of two adjoined trapezoidal sections. When engaged, and because of proper sizing, seal ring 312 will form a metal-to-metal seal with grooves 308 and 310 thus effectively acting as a seal against both internal and external pressure.

Figure 12:
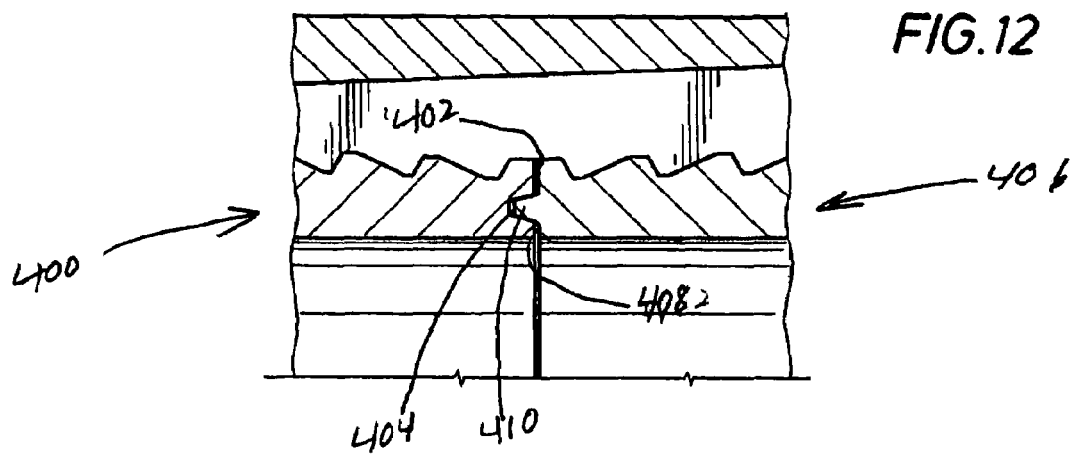
FIG. 12 is a fragmentary, elevational, cross-sectional view of another embodiment of the present invention.

FIG. 12 shows another embodiment for effecting a seal assembly against external and internal pressures. A first tubular member 400 has an end face 402 in which is formed an annularly extending, axially facing groove 404. Second tubular member 406 has an end face 408 from which extends an annular projection 410, projection 410 being generally complementary in shape to groove 404. Accordingly, when first and second tubular members 400 and 406 are brought together, and since projection 410 and groove 404 are properly sized and in register, projection 410 will engage groove 404 in a metal-to-metal sealing arrangement.

Although in the description above, the formations on the tubular members and on the segmented rings have been described in terms of axially spaced alternating, annular grooves and projections, it will be apparent that the grooves and projections need not be completely annular, i.e., there could be discontinuities. It is only necessary that the formations on the tubular members and the segmented ring, whatever their configuration, be such that there be surfaces on the segmented ring which engage surfaces on the tubular members which, when the segmented ring is subjected to a radially inwardly directed compressive force, force the two tubular members toward one another, preferably in metal-to-metal relationship.

It will also be appreciated that while the seal rings have been described as being C seals, other seal rings can be employed. The characteristics of the seal rings must be such that they can withstand elevated temperatures and pressures. Thus, although such seals will generally be of metallic construction, it is conceivable that certain non-metallic seals, e.g., certain engineered plastic seals capable of withstanding high temperatures and pressures may be employed. Generally speaking, however, the seal rings will be metallic in nature. It is also to be understood that while a variety of seal assemblies have been shown for sealing against both internal and external pressure to which the tubular members are subjected, other seal assemblies may be employed. The only requirement of the seal assembly whether it be of the types shown in FIG. 1, 4, 7, 11, or 12 is that it be capable of creating a fluid-tight seal against internal pressure acting from inside the tubular members and external pressure acting externally of the tubular members.

It will be appreciated by those skilled in the art that to finally assemble the riser assembly of the present invention, it is necessary to force the sleeve over the segmented ring, whether it be the collet shown in FIG. 7 or any of the other segmented rings of the other embodiments. This can be accomplished hydraulically, pneumatically or mechanically. One simple mechanical method of positioning the sleeve over the segmented ring to achieve a fully assembled marine assembly of the present invention is depicted in FIGS. 13 and 14. The embodiment shown in FIGS. 13 and 14 is a modification of the embodiment shown in FIG. 7. Referring then to FIG. 13, tubular member 200A is provided with an externally threaded, axially extending portion 420, threaded portion 420 being near to but extending axially away from formations 240A on collet 240. Formations 240A extend from a first end 240B of collet 240. As can also be seen, the smallest diameter portion 240C on the external surface of collet 240 is adjacent first end 240B. In the position shown in FIG. 13, it can be seen that end faces 202 and 206 have been brought into engagement with guide ring 216 and C seals 226, 228 and 232 in place. However, as is also seen the formations, e.g., formations 240A on collet 240, have not engaged the formations on the tubular members 204 and 200A.

To accomplish this, reference is now made to FIG. 14. Sleeve 272A has a first end 272B and a second end 272C. Formed on the end 272C is an annular, radially inwardly extending flange 422, flange 422 being provided with a threaded portion 424 extending axially therealong, threaded portion 424 being complimentary and threadably mating to threaded portion 422 on tubular member 200A. As seen, the smallest diameter portion 274A of surface 274 is proximate flange 422 and accordingly threaded portion 424.

As sleeve 272A is moved axially in the direction of arrow A, threads 424 on flange 422 will come into engagement with threads 420 on tubular member 200A. Once the threads 420 and 424 have engaged, rotation of sleeve 272A will force sleeve 272A in the direction of arrow A such that surface 274 on sleeve 272A and surface 270 on segmented ring will now be forced into engagement. Rotation of sleeve 272A is continued until there is essentially full engagement between surfaces 270 and 274, e.g., until the formations on collet 240 are in engagement with the formations on tubular members 204 and 200A. At this point, the marine assembly is fully assembled. It should be observed that in FIG. 13 a considerable gap is shown between collet 240 and tubular members 204 and 200A. The gap has been exaggerated for purposes of showing how the formations on collet 240 come together with the formations on tubular members 204 and 200A under the influence of the force being applied by sleeve 272A as it is threaded axially along tubular member 200A. In point of fact, in the condition shown in FIG. 13, while the formations would be engaged to some extent, the engagement would not be sufficient to ensure a connection with fluid-tight sealing and mechanical integrity.

Referring now to FIGS. 15 and 16 there is shown another mechanical technique for assembling the riser assembly of the present invention. Referring first to FIG. 15, it can be seen that segmented ring 500 has a threaded portion 502 extending axially along the external surface 504 of segmented ring 500. Sleeve 506 has an internally threaded, axially extending portion 508, the threads of threaded portion 508 mating with the threads of threaded portion 502. As shown in FIG. 15, sleeve 506 has been moved axially in the direction of arrow B such that there has been engagement, as shown at 510, between the first thread of threaded portion 508 nearest the end 512 of sleeve 506 and the thread of threaded portion 502 most distal end 513 of segmented ring 500.

Referring now to FIG. 16, it can be seen that continued rotation of sleeve 506 relative to segmented ring 500 will fully engage the threaded portions 502 and 508 thereby forcing segmented ring 500 radially inwardly towards tubular members 200 and 204 which results in forcing the respective formations in segmented ring 500 into engagement with the formations on tubular members 200 and 204.

While the threaded portion 502 and 508 have been shown as extending axially from the ends 513 and 512 of segmented ring 500 and sleeve 506, respectively, it will be appreciated that the threaded portions could be on the opposite ends. Thus threaded portion 508 could be near end 516 of sleeve 506 while threaded portion 502 could be near end 518 of segmented ring 500. It will also be appreciated that substantially all or in fact all of the external surface of segmented ring 500 could be threaded and that substantially all or all of the internal surface of sleeve 506 could be threaded. Lastly, it will be recognized that the threaded portions on segmented ring 500 of sleeve 506 can be positioned anywhere along the axial length of those components, the proviso being that the threaded portions engage and are threaded together to achieve an assembled condition as shown in FIG. 16. For example, segmented ring 500 could have a threaded portion intermediate but distal ends 513 and 518 while sleeve 506 could have a segmented portion intermediate but distal ends 512 and 516.

The threaded portions used on any of the embodiments shown in FIGS. 13-16 can employ any type of thread form as, for example, API threads, buttress threads, etc. It will also be appreciated that for speed of make-up, the threaded portions on the segmented ring and the sleeve can be multi-start, e.g., double-start, four-start, etc.

The terms "near," "approximate," or variants thereof, are intended to mean that one surface, component, etc., can engage another surface of component as well as that one surface, component, etc., can be spaced from but in relatively close proximity to a second surface, component, etc.

The embodiments shown in FIGS. 13, 14, 15 and 16 provide an easy method to not only assemble but also disassemble the marine riser assembly of the present invention. Threading of components to assemble and disassemble them in offshore environments is commonly done and the necessary equipment is readily available. Thus, while forcing the sleeve over the segmented ring can be done by hydraulic methods, pneumatic methods, electromechanical methods, etc. The mechanical techniques depicted in FIGS. 13, 14, 15 and 16 provide one of the easiest and least expensive techniques since it eliminates the need for special hydraulic, pneumatic or electrical power sources. As well, the techniques depicted using the apparatus as shown in FIGS. 13, 14, 15 and 16 provide an easy method to disassemble the marine riser assembly since the sleeve can be easily removed simply by unthreading.

The foregoing description and examples illustrate selected embodiments of the present invention. In light thereof, variations and modifications will be suggested to one skilled in the art, all of which are in the spirit and purview of this invention.

What is claimed is:

1. A marine riser assembly comprising:
a first tubular member having a first end face and an external surface, there being a plurality of first, axially spaced, formations on said external surface adjacent said first end face;
a second tubular member, said second tubular member having a second end face and an external surface, there being a plurality of second, axially spaced, formations adjacent said second end face, said first and second end faces being adjacent each other;
a seal assembly for sealing against external and internal pressure;
a segmented ring in surrounding relationship to said first and second tubular members and spanning said adjacent end faces, said segmented ring having an inner surface, there being a plurality of third, axially spaced, formations engageable with said first formations on said inner surface and a plurality of fourth, axially spaced, formations engageable with said second formations on said inner surface, said first and third formation having engaged surfaces urging said first end face toward said second end face when said segmented ring is under radially inwardly directed compressive force, said second and fourth formations having engaged surfaces urging said second end face toward said first end face when said segmented ring is under radially inwardly directed compressive force, said segmented ring having an external surface with at least a portion being tapered,
a sleeve having an inner surface with at least a portion having a taper complementary to said tapered portion of said external surface of said segmented ring, said sleeve exerting said compressive force when said tapered surface portions are engaged;
an annular guide disposed between said first and second tubular members for maintaining said first and second tubular members generally coaxial, said first tubular member having a first counterbore in said first end face and said second tubular member having a second counterbore in said second end face, said first and second counterbores cooperating to form an annular, radially inwardly extending recess spanning said adiacent end faces, said first tubular member having a first annular, axially extending groove opening into said first counterbore, said second tubular member having a second annular, axially extending groove opening into said second counterbore, said annular guide being generally T-shaped in cross-section and having a first annular, axially extending flange received in said first groove and a second annular, axially extending flange received in said second groove, said first groove having a first annularly extending axially facing end wall and said second groove having a second annularly extending, axially facing end wall, said first flange being spaced from said first end wall, said second flange being spaced from said second end wall thereby forming first and second annularly extending seal ring pockets, respectively; and
a first resilient seal ring being received in said first seal ring pocket and a second resilient seal ring being received in said second seal ring pocket.

2. The riser assembly of claim 1, wherein said first and second seal rings comprise C seals.

3. The riser assembly of claim 1, wherein there is an annular recess formed by and between said first and second adjacent end faces and there is a resilient seal ring received in said annular recess.

4. The riser assembly of claim 3, wherein said resilient seal comprises a C seal.

5. The riser assembly of claim 1, wherein said T-shaped guide includes a radially inwardly projecting, annularly extending rib, said rib having a first axially facing surface and a second axially facing surface, said first flange being in engagement with said first axially facing wall, said second flange being in engagement with said second axially facing wall, a first annular, radially inwardly opening recess formed between said first axially facing surface and said first tubular member and a second annular, radially inwardly opening recess formed between said second axially facing surface and said first tubular member, a first resilient seal ring being received in said first recess, a second resilient seal ring being received in said second recess.

6. The riser assembly of claim 5, wherein said first and second seal rings are C seals.

7. The riser assembly of claim 5, wherein there is an annular recess formed by and between said first and second adjacent end faces and radially outwardly of said guide and there is a resilient seal ring received in said annular recess.

8. The riser assembly of claim 7, wherein said resilient seal comprises a C seal.

9. The riser assembly of claim 1, wherein said segmented ring comprises an annular body, said annular body having an annular wall, a first end and a second end, a plurality of first, circumferentially spaced slits extending through said first end and said annular wall to a point distal said second end and a plurality of second, circumferentially spaced slits extending through said second end and said annular wall to a point distal said first end, said first and second slits alternating to form a series of interconnected axially extending, circumferentially expandable fingers.

10. The riser assembly of claim 9, wherein said annular body comprises a plurality of sections.

11. The riser assembly of claim 9, wherein said annular body is monolithic.

12. The riser assembly of claim 9, wherein said annular body has a single split extending through the length of the annular body and said first and second ends.

13. A marine riser assembly comprising:
a first tubular member having a first end face and an external surface, there being a plurality of first, axially spaced, formations on said external surface adjacent said first end face;
a second tubular member, said second tubular member having a second end face and an external surface, there being a plurality of second, axially spaced, formations adjacent said second end face, said first and second end faces being adjacent each other;
a seal assembly for sealing against external and internal pressure;
a segmented ring in surrounding relationship to said first and second tubular members and spanning said adjacent end faces, said segmented ring having an inner surface, there being a plurality of third, axially spaced, formations engageable with said first formations on said inner surface and a plurality of fourth, axially spaced, formations engageable with said second formations on said inner surface, said first and third formation having engaged surfaces urging said first end face toward said second end face when said segmented ring is under radially inwardly directed compressive force, said second and fourth formations having engaged surfaces urging said second end face toward said first end face when said segmented ring is under radially inwardly directed compressive force, said segmented ring having an external surface with at least a portion being tapered, said segmented ring comprises an annular body, said annular body having an annular wall, a first end and a second end, a plurality of first, circumferentially spaced slits extending through said first end and said annular wall to a point distal said second end and a plurality of second, circumferentially spaced slits extending through said second end and said annular wall to a point distal said first end, said first and second slits alternating to form a series of interconnected axially extending, circumferentially expandable fingers; and
a sleeve having an inner surface with at least a portion having a taper complementary to said tapered portion of said external surface of said segmented ring, said sleeve exerting said compressive force when said tapered surface portions are engaged.

14. The main line assembly of claim 13, wherein said annular body is monolithic.

15. The annular body of claim 14, wherein said annular body has a single split extending through the length of the annular body and said first and second ends.

16. The riser assembly of claim 13, wherein said annular body comprises a plurality of sections.

* * * * *